(12) United States Patent
Joo

(10) Patent No.: US 9,874,748 B2
(45) Date of Patent: Jan. 23, 2018

(54) GLASS TYPE TERMINAL

(71) Applicant: LG ELECTRONICS INC., Seoul (KR)

(72) Inventor: Wonseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 15/028,999

(22) PCT Filed: Apr. 18, 2014

(86) PCT No.: PCT/KR2014/003398
§ 371 (c)(1),
(2) Date: Apr. 13, 2016

(87) PCT Pub. No.: WO2015/072633
PCT Pub. Date: May 21, 2015

(65) Prior Publication Data
US 2016/0274357 A1  Sep. 22, 2016

(30) Foreign Application Priority Data

Nov. 12, 2013  (KR) .................. 10-2013-0136836

(51) Int. Cl.
*G02B 27/01* (2006.01)
*H04N 5/225* (2006.01)
(Continued)

(52) U.S. Cl.
CPC .......... *G02B 27/017* (2013.01); *G02B 27/01* (2013.01); *H04N 5/2252* (2013.01);
(Continued)

(58) Field of Classification Search
None
See application file for complete search history.

(56) References Cited

U.S. PATENT DOCUMENTS 6,349,001 B1   2/2002  Spitzer
6,483,483 B2  11/2002  Kosugi et al.
(Continued)

FOREIGN PATENT DOCUMENTS

KR   10-2004-0102969 A   12/2004
KR      10-1198401 B1   11/2012

*Primary Examiner* — Timothy J Henn
(74) *Attorney, Agent, or Firm* — Birch, Stewart, Kolasch & Birch, LLP

(57) ABSTRACT

There is disclosed a glass type terminal including a band frame comprising a front portion located over a user's eyes and a side portion extended toward both ears from the front portion to be worn on the user's head, a first housing located in one end of the band frame, in which a first control unit is mounted, a second housing located in the other end of the band frame, in which a battery is mounted, a third housing coupled to a lateral surface of the band frame, adjacent to the front portion, in which a second control unit is mounted, a front housing coupled to the third housing by a hinge frontward, and a transparent display coupled to the front housing to be located in front of the user's eyes. Accordingly, the right and left weights of the glass type terminal are balanced such that the glass type terminal may be worn stably, when worn on the user's face.

13 Claims, 4 Drawing Sheets

(51) Int. Cl.
*H04N 5/232* (2006.01)
*H04N 5/235* (2006.01)

(52) U.S. Cl.
CPC ....... *H04N 5/2353* (2013.01); *H04N 5/23216* (2013.01); *G02B 2027/0138* (2013.01); *G02B 2027/0178* (2013.01)

(56) References Cited

U.S. PATENT DOCUMENTS

| | | | | |
|---|---|---|---|---|
| 7,500,747 B2* | 3/2009 | Howell | ............... | G02C 11/10 351/158 |
| 7,631,968 B1* | 12/2009 | Dobson | ............... | G02C 11/10 345/8 |
| 7,740,353 B2* | 6/2010 | Jannard | ............... | A61B 5/1112 351/158 |
| 8,665,177 B2* | 3/2014 | Herrmann | ............... | G02B 27/017 345/8 |
| 9,092,898 B1* | 7/2015 | Fraccaroli | ............... | G06T 19/006 |
| 9,341,843 B2* | 5/2016 | Border | ............... | G02B 27/0093 |
| 9,366,862 B2* | 6/2016 | Haddick | ............... | G02B 27/0093 |
| 9,377,627 B2* | 6/2016 | Watanabe | ............... | G02B 27/0176 |
| 9,619,201 B2* | 4/2017 | Jannard | ............... | G02C 9/04 |
| 2002/0159023 A1* | 10/2002 | Swab | ............... | H04W 56/0015 351/158 |
| 2004/0113867 A1* | 6/2004 | Tomine | ............... | G02B 27/0172 345/8 |
| 2005/0136977 A1* | 6/2005 | Levy | ............... | H04B 1/385 455/557 |
| 2006/0052146 A1* | 3/2006 | Ou | ............... | H04M 1/05 455/575.2 |
| 2008/0169998 A1* | 7/2008 | Jacobsen | ............... | G02B 27/0172 345/8 |
| 2008/0198324 A1* | 8/2008 | Fuziak | ............... | G02B 27/0172 351/158 |
| 2009/0002626 A1* | 1/2009 | Wakabayashi | ............... | G02C 11/06 351/116 |
| 2010/0309426 A1* | 12/2010 | Howell | ............... | G02C 5/143 351/158 |
| 2012/0002159 A1* | 1/2012 | Blum | ............... | G02C 7/081 351/113 |
| 2012/0299870 A1* | 11/2012 | Chi | ............... | G02B 27/017 345/174 |
| 2013/0044042 A1* | 2/2013 | Olsson | ............... | G02B 27/0176 345/8 |
| 2013/0194141 A1* | 8/2013 | Okajima | ............... | G02C 11/10 343/718 |
| 2013/0235331 A1* | 9/2013 | Heinrich | ............... | G02C 11/10 351/158 |
| 2013/0249776 A1* | 9/2013 | Olsson | ............... | G06F 1/163 345/8 |
| 2015/0022773 A1* | 1/2015 | Kim | ............... | G02C 11/10 351/44 |

* cited by examiner

GLASS TYPE TERMINAL

CROSS REFERENCE TO RELATED APPLICATIONS

This application is the National Phase of PCT International Application No. PCT/KR2014/003398, filed on Apr. 18, 2014, which claims priority under 35 U.S.C. 119(a) to Patent Application No. 10-2013-0136836, filed in the Republic of Korea on Nov. 12, 2013, which is hereby expressly incorporated by reference into the present application.

TECHNICAL FIELD

Embodiments of the present disclosure relate to a glass type terminal including a camera and a transparent screen so as to acquire and use information easily while living a daily life.

BACKGROUND ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

The growing interest in wearable terminals for easy usage and convenience has led to active researches and studies on various wearable typed mobile terminals such as glasses types, bracelet types, watch types and wearable types on clothes.

SUMMARY OF THE INVENTION

To overcome the disadvantages, an object of the present invention is to provide a glass type terminal which is wearable on a user's eyes stably, with easy carrying.

To achieve these objects and other advantages and in accordance with the purpose of the embodiments, as embodied and broadly described herein, a glass type terminal includes a band frame comprising a front portion located over a user's eyes and a side portion extended toward both ears from the front portion to be worn on the user's head; a first housing located in one end of the band frame, in which a first control unit is mounted; a second housing located in the other end of the band frame, in which a battery is mounted; a third housing coupled to a lateral surface of the band frame, adjacent to the front portion, in which a second control unit is mounted; a front housing coupled to the third housing by a hinge frontward; and a transparent display coupled to the front housing to be located in front of the user's eyes.

The first housing or the second housing may include an input/output unit for being provided with data or an electric power.

The glass type terminal may further include an auxiliary battery comprising one end inserted in the input/output port and the other end coupled to the first housing or the second housing where the input/output port is not formed, to apply an electric current through the input/output port.

The first housing may further include an ear jack.

The hinge of the front housing may include an angle limiting portion.

The third housing may include a touch sensor.

The second control unit may operate a shutter of the camera when recognizing that the user touches the touch sensor and the touch disappears after that.

The band frame may include a first frame arranged an outer portion; a second frame arranged in an inner portion; and a cable passage formed between the first frame and the second frame.

A flexible printed circuit board for transmitting a signal between a first control unit and a second control unit and a power cable provided from a battery to the first control unit and the second control unit may be mounted in the cable passage.

One or more of the first and second frames may be formed of a metallic material and the metallic frame may be an antenna for transmitting an electromagnetic signal by receiving an electric power.

The metallic frame may be an antenna comprising one or more bent portions to transmit a signal in two or more band widths.

The weight of the second housing may be larger than or the same as the weight of the first housing.

The weight of the first housing may be larger than the weight of the third housing and the weight of the front housing.

According to at least one embodiment of the invention, the right and left weights of the glass type terminal are balanced. Accordingly, the glass type terminal may be worn stably, when worn on the user's face.

Furthermore, the size of the glass may be reduced to prevent the glass type terminal from running down and from looking dull or sluggish.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

DETAILED DESCRIPTION OF EMBODIMENTS OF THE INVENTION

In the following detailed description, reference is made to the accompanying drawing figures which form a part hereof, and which show by way of illustration various embodiments.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Figure 1:
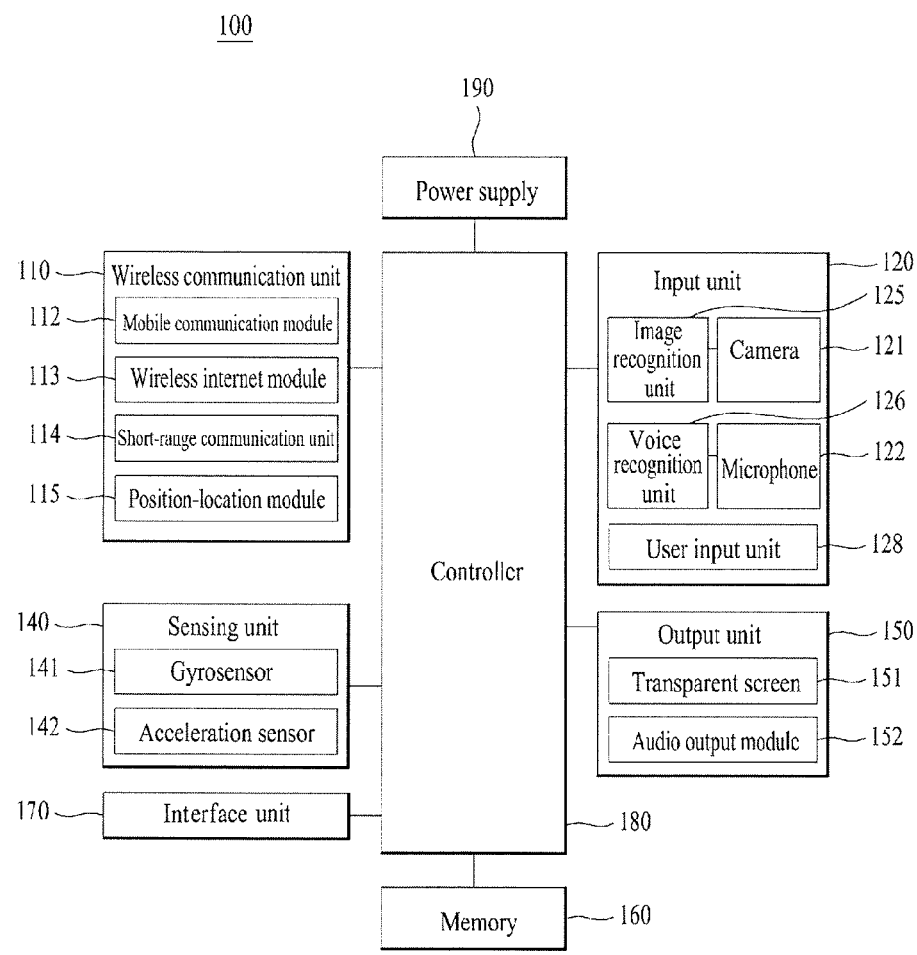
FIG. 1 is block diagram of a glass type terminal according to one embodiment of the invention.

FIG. 1 is a block diagram of a mobile terminal 100 in accordance with an embodiment as broadly described herein. The mobile terminal 100 may include a wireless communication unit 110, an A/V (audio/video) input unit 120, a user input unit 128, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a mobile communication module 112, a wireless internet module 113, a short-range communication module 114, a position-location module 115 and the like.

The mobile communication module 112 transmits/receives wireless signals to/from one or more network entities (e.g., base station, external terminal, server, etc.) via a mobile network such as GSM (Gobal System for Mobile communications), CDMA (Code Division Multiple Access), WCDMA (Wideband CDMA) and so on. Such wireless signals may represent audio, video, and data according to text/multimedia message transmission and recetion, amongothers.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

An image recognition unit 125 is a device configured to extract information from an image photographed by the camera 121 and the image recognition unit 125 may identify the photographed image. In case the photographed image has a character, the image recognition unit converts a character into text data. In case the image has a plurality of objects, the image recognition unit extracts an object which will be compared with information stored in the memory 160.

In case the camera 121 photographs a motion picture, the motion picture consists of still images and the image recognition unit 125 acquires information of all the still images and the controller processes the acquired information. However, this process might be unnecessary waste. In addition, if such unnecessary information is extracted and provided to a user, it is inconvenient of a user to use a glass type mobile terminal 100 wearable like glasses.

When the user presses the user input unit 128 provided in the frame or uses a voice command for acquiring image information, the user can extract necessary information. Alternatively, when looking at one object for more than a preset time period, the camera 121 may photograph the same object for more than a preset time period and information on the object may be extracted.

Alternatively, when the user approaches a specific object, the object occupies a large area of the user's view and it can be determined that the user is looking at the corresponding object. Hence, when one object of the images recognized by the camera 121 occupies a preset range of images composing the motion picture, information on the object may be extracted.

Alternatively, the image recognition unit 125 may recognize a gesture created by the user and processes the input gesture as a user command. For example, the image recognition unit 125 may recognize a circle drawn by the user as yes or perform a function of selecting a character or object located in the circle.

A voice recognition unit 126 may convert the user's voice inputted via the microphone 122 into text data or recognize the user's voice as a specific command (hereinafter, a voice command). As the glass type mobile terminal 100 according to the present invention can include a keyboard, a function of the voice recognition unit 126 configured to recognize the user's voice command is important so as to activate the functions of the mobile terminal.

It is difficult for the glass type mobile terminal 100 to include the keyboard. However, the glass type mobile terminal 100 may include a button type user input unit 128 on the frame and a command used frequently may be inputted via the button type user input unit 128. For example, the user can input a command for photographing an image watched by the user or extracting information from the image or a command for controlling a volume of a sound outputted from the audio output unit 152 via the button type user input unit 128.

Various types may be applicable as the user input unit 128 and such various types includes a module for recognizing a physical pressure from a metallic dome formed therein to generate a signal.

The sensing unit 140 senses a state of the mobile terminal 100 and a user surrounding environment and such the sensing unit 140 may include a gyrosensor 141 and an acceleration sensor 142.

The gyrosensor 141 is a device configured to sense a tilted phase of the mobile terminal and tilted variation in x, y and z axes, and it can be called as an angular velocity sensor. The gyrosensor senses a rotational movement with respect to each axis to sense tilting and shaking of the mobile terminal case.

A conventional gyrosensor has a spinning top, with three axes and such a gyrosensor is developed to have an improved precision and a compact size such as an optical gyrosensor or a vibration gyrosensor recently, such that a current developing gyrosensor can be mountable in compact-sized electronics including a mobile terminal. In addition, 6-axis sensor realized by MEMS module can be used as the gyrosensor 141.

The gyrosensor 141 applied to the present invention is not limited to those types mentioned above and all types of gyrosensors capable of sensing tilting and motion of the glass type mobile terminal 100 can be applicable to the present invention.

The acceleration sensor 142 may measure a dynamic force, for example, an acceleration of the glass type mobile terminal 100 and it can detect vibration, shocks and so on from acceleration change. When an object having mass is accelerated, a force is generated and variation of the force is sensed by the acceleration sensor 142.

The output unit 150 generates outputs relevant to the senses of sight, hearing, touch and the like. And, the output unit 150 includes the transparent screen 151, an audio output module 152 and the like.

The transparent screen 151 is arranged in front the user's eyes and it is similar to a lens of glasses. The transparent screen arranged in front of the user's eyes allows the user to see objects located in front and it may be transparent and configured to output a text or image to a screen so as to provide the user with information.

A main example of the transparent screen 151 may be TOLED (Transparent OLED) and a rear structure of the transparent display 151 may be configured to be a light transmissive structure.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, receivers, bone conduction audio producing devices, and combinations thereof.

In the memory 160 may be stored programs configured for the controller 180 to process and control and to implement a function for temporarily storing input/output data. The memory 160 may store new input data therein and extract the stored data. A storage function of the memory 160 may be expanded by an SD card or an auxiliary storage device.

The interface unit 170 may be employed as a passage to external devices connected with the glass type terminal 100. The interface unit 170 may be provided with data from the external devices or the power which will be transmitted to each of the internal elements provided in the glass type terminal 100, or it may transmit internal data of the glass type terminal 100 to the external devices.

For instance, examples of the interface unit 170 may include a wire/wireless headset port, an external charger port, a wire/wireless data port, a memory card port, a port for connecting a device having an identification module, an audio 1/0 (Input/Output) port, a video 1/0 (Input/Output) port, an earphone 154 port (FIG. 5) and the like.

The identification module is a chip in which a variety of information for user identify authentication of the glass type terminal 100 is stored. The identification module may include a user identify module (UIM), a subscriber identify module (SIM), a universal subscriber identity module (USIM), and the like. The device including the identity module (hereinafter, identity device) may be manufactured as a smart card. Accordingly, the identify device may be connected to the terminal 100 through a port.

The interface unit 170 may be a passage for providing the mobile terminal 100 with the power from the cradle, when the terminal 100 is connected to an external cradle, or a passage for transmitting various command signals input from the cradle to the mobile terminal. The command signals input from the cradle or the power may be operated as signals for recognizing that the mobile terminal is loaded in the cradle properly.

The controller 180 may typically control an overall operation of the mobile terminal. The controller 180 may control the wireless communication unit to transmit/receive various signals or process the input data or control the transparent screen 151 and the audio output unit, only to provide information to the user. The image recognition unit 125 and the voice recognition unit 126 mentioned above may be provided in the controller as parts.

The controller 180 according to the present invention may extract information from the image acquired by the camera 121 and compare the extracted information with the stored information. Also, the controller 180 may store the extracted information in the memory 160, output associated information extracted from the memory 160 to output the extracted information to the transparent screen 151 or search for the associated information on the internet.

The power supply unit 190 provides power required by the various components for the glass type mobile terminal 100. The power may be internal power, external power, or combinations thereof.

A battery may include a built-in rechargeable battery and may be detachably attached to the terminal body for a charging and the like.

Various embodiments described herein may be implemented in a computer-readable medium using, for example, computer software, hardware, or some combination thereof.

Figure 2:
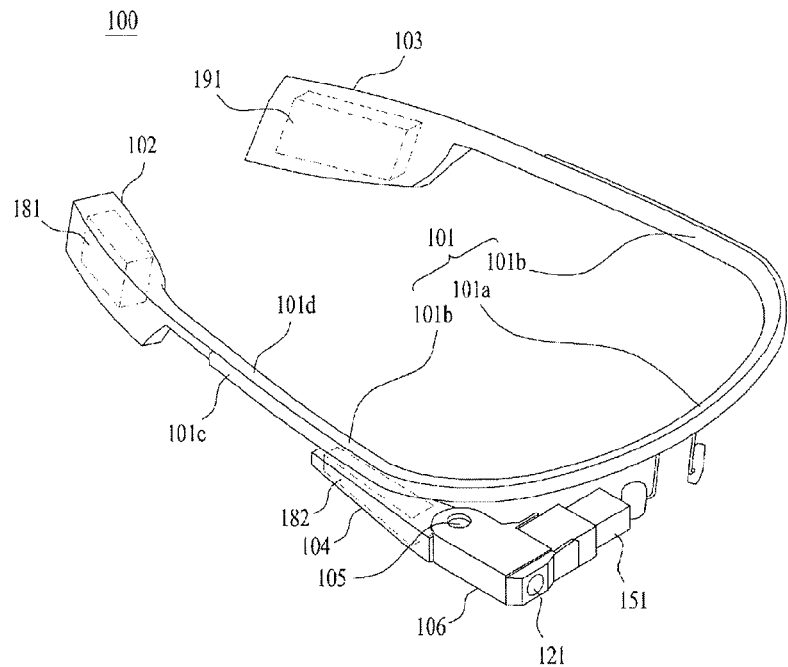
FIG. 2 is a perspective diagram illustrating a front surface of a glass type terminal according to one embodiment of the invention.

FIG. 2 is a front perspective diagram of a glass type terminal 100 according to one embodiment of the invention. Referring to FIG. 2, the glass type terminal 100 according to the present embodiment includes a band frame 101, a first housing 102, a second housing 103, a third housing 104, a front housing 106, a transparent display 151 and a camera 121.

The band frame 101 may include a front portion 101a located beyond the user's eyes and a side portion 101b extended toward the user's each ear. The front portion 101a and the side portion 101b are mounted to the user's head, with surrounding front and side areas of the user's head.

The band frame 101 has to be wearable even if the size of the user's head is varied. Accordingly, the band frame 101 may be formed of a plastic material or an elastic material which can be shape-changeable.

When the band frame 101 is partially formed of a metallic material, a clean profile can be provided to the glass type terminal and causes an effect that the band frame looks thinner. The metallic portion of the band frame 101 may be used as an antenna. A first frame 101c located outside may be formed of a metallic material to make the metallic frame portion seen outside.

Considering a length of a frequency sent/received by the antenna, the first frame 101c formed of the metallic material may include one or more bent portions to send signals in two or more frequency bands.

Figure 3:
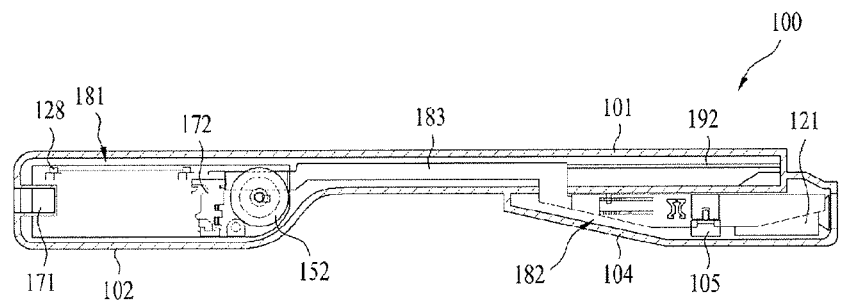
FIG. 3 is a sectional diagram illustrating a band frame of a glass type terminal according to one embodiment of the invention.

FIG. 3 is a sectional diagram of the band frame 101, showing the first frame 101c, a second frame 101d, a flexible printed circuit board 183 and a power cable 192. The band frame 101 according to the present embodiment has the first frame 101c formed of the metallic material, located outside, and the second frame 101d formed of a plastic material, located inside. The first frame 101c and the second frame 101d are coupled to each other. A predetermined space is formed between the first frame 101c and the second frame 101d, such that the flexible printed circuit board 183 and the power cable 192 for electrical connection between parts may be mounted in the space.

Figure 4:
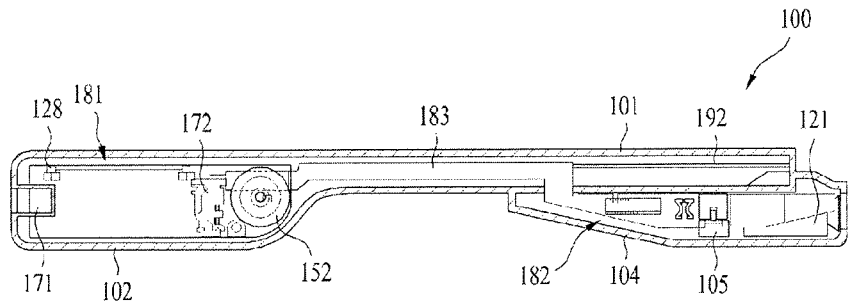
FIG. 4 is a sectional diagram illustrating a glass type terminal according to one embodiment of the invention.

The first housing 102 is provided in one end of the band frame 101 and a first control unit 181 is mounted in the first housing 102. FIG. 4 is a sectional diagram illustrating a glass type terminal according to one embodiment of the invention. Referring to FIG. 4, the first control unit 181 may include an interface unit 170 connected to an external electric/electronic device and an audio output unit 152 for transmitting sound to the user's ear.

In addition, a button 128 may be further provided as a user input unit for turning on and off power supply or for activating a specific function. A first substrate having a corresponding shape to the first housing 102 to mount the parts may be provided in the first housing 102.

An input/output port 171 and an ear jack 172 may be further provided as the interface 170. When connected with the power, the input/output port 171 may charge the battery 191 of the glass type terminal 100. When connected with an external terminal, the input/output port may send/receive data to/from an external terminal.

The ear jack 172 may be provided as the interface for outputting an audio signal when the user is using the earphone 154. Recently, the terminal can receive not only audio information simply but also signals of a microphone or a remote control provided in the ear phone 154 such that functions of the terminal can be expanded.

Rather than the method of connecting the earphone 154 to the ear jack 172 to transmit audio information to the user, there may be a bone conduction method of transmitting vibration to a user's cranial bone so as to transmit sound to the user. The first housing 102 may be in close contact with the user's ear and a vibrator for transmitting audio information in a bone conduction method may be mounted in the first housing so as to transmit vibration to the user's cranial bone directly, such that the audio information can be transmitted.

The second housing 103 may be provided in the other end of the band frame 101 and the battery 191 may be mounted in the second housing 103. When electric/electronic parts are arranged in only one end of the band frame 101, the band frame could be inclined enough for the glass type terminal 100 worn by the user to fall down.

To balance right and left weights of the band frame 101, the second frame 103 may be provided to arrange the battery 191 in the other end of the band frame 101. The power cable 192 shown in FIG. 3 may be used as a passage of the power connection between the first housing 102 and the second housing 103.

Figure 5:
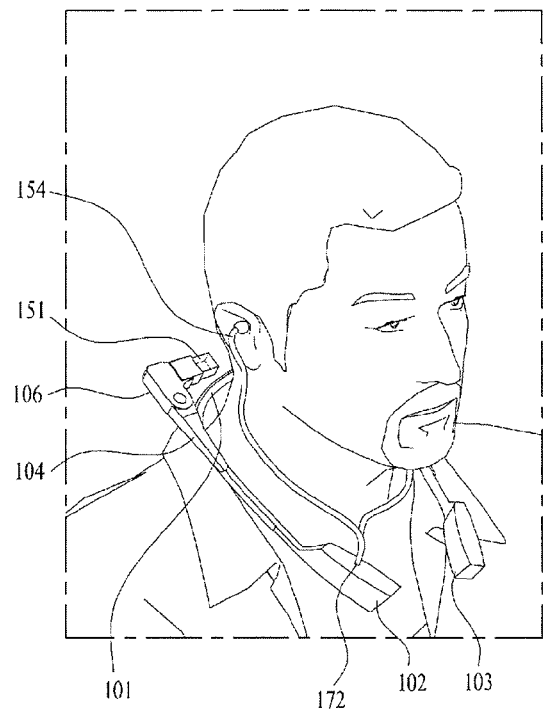
FIG. 5 is a diagram illustrating a state where a user is wearing a glass type terminal according to one embodiment of the invention.

FIG. 5 illustrates a method of wearing a glass type terminal 100 on the neck according to one embodiment of the invention. The balance between the first housing 102 and the second housing 103 can be kept, when the glass type terminal 100 is worn by the user on the neck as shown in FIG. 5, such that the glass type terminal 100 may be easily wearable on the neck, without leaning to one side.

When the user wears the glass type terminal 100, the earphone 154 may be connected to the ear jack 172 for the user to listen to music or talk on a phone. The earphone 154 used at this time may be relatively short as shown in FIG. 5.

The third housing 104 may be coupled to the side portion 101b, adjacent to the front portion 102a. A control unit 182 for controlling the transparent display 151 located in front of the user's eyes or the camera 121 facing forward may be provided in the third housing 104. A predetermined portion of the control unit may be located in the third housing 104 to implement the control of the transparent display 151 or the camera 121.

Figure 6:
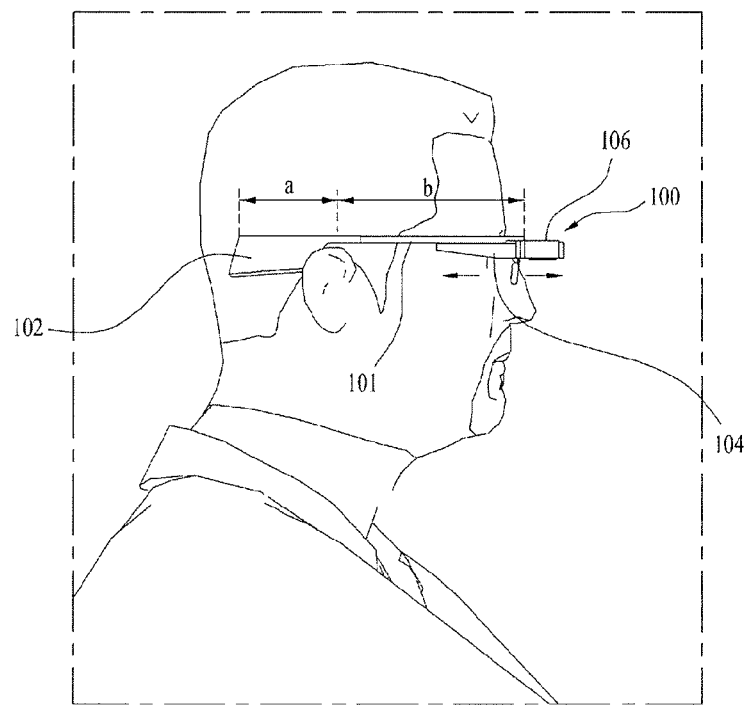
FIG. 6 is a perspective diagram illustrating a hinge coupling between a transparent display and a third housing in a glass type terminal according to one embodiment of the invention.

The third housing 104 and the first housing 102 are demounted from each other, a front and rear balance as well as the right and left balance may be kept. FIG. 6 illustrates a state where the user is wearing the glass type terminal. When a length ratio with respect to the ear is a:b, a weight ratio of the first housing 102 to the third housing 104 and the front housing 106 which will be described later may be b:a to keep the balance in consideration of the position of the user's ear.

At this time, the former weight includes the weight of the first control unit 181 mounted in the first housing 102. The latter weight includes the second control unit 182, the display 151 and the camera 121 mounted in the third housing 104 and the front housing.

A user input unit may be further provided in a lateral surface of the third housing 104. The user input unit may be a pressure input type operated by a physical force applied by the user such as a button or a touch type using a touch sensor.

In the touch type user input unit, the force applied to the band frame is relatively smaller than the force in the button type user input unit. The user may touch or touch/drag the lateral surface of the third housing 104 and input preset commands to control sound, zooming of a camera and change of a screen output on the transparent display 151.

Even when the finger touching the screen is off, a signal may be recognized. For instance, the user controls zooming by touch&drag and leaves the touch sensor. After that, the camera 121 stores an image of the moment. In case even the performance of the finger s leaving is recognized as a command, the disadvantage of the difficulty of gaining an accurate image which could be caused by the shaking camera 121.

The front housing 106 is connected with the third housing 104. The transparent display 151 and the camera 121 located in front of the user's eyes are mounted in the front housing 106. As the transparent display 151 and the camera 121 have to be arranged in front of the eyes frontward, the front housing 106 may be hingedly coupled to the third housing 104.

Figure 7:
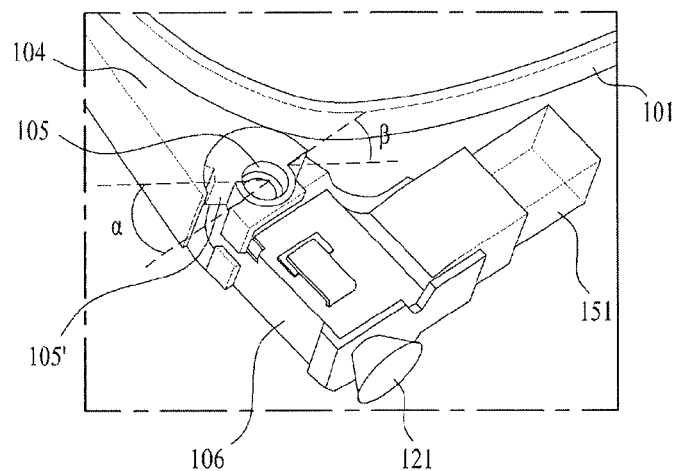
FIG. 7 is a perspective diagram illustrating a glass type terminal and an auxiliary battery according to one embodiment of the invention.

FIG. 7 is a perspective diagram illustrating a hinge 105 between the front housing 106 and the third housing 104 of the glass type terminal 100 according to one embodiment of the invention.

When the hinge 105 is rotating at a large angle, the space in which the flexible printed circuit board 183 for transmitting between the third housing 104 and the front housing 106 is arranged could be limited. Accordingly, the hinge 105 may include an angle limiting portion 105' and the rotation angle of the hinge 105 may be limited within a preset range of angles. The flexible printed circuit board 183 for connecting the second control unit 182 and the camera 121 which are mounted in the third housing 104 and the transparent display 151 with each other may penetrate the angle limiting portion 105.

When the user's head is much larger or smaller than an average value, the camera 121 cannot be frontward in case of a small rotation angle of the hinge portion. When the range of the rotation is enlarged to be 35~40, more users may use the glass type terminal.

Figure 8:
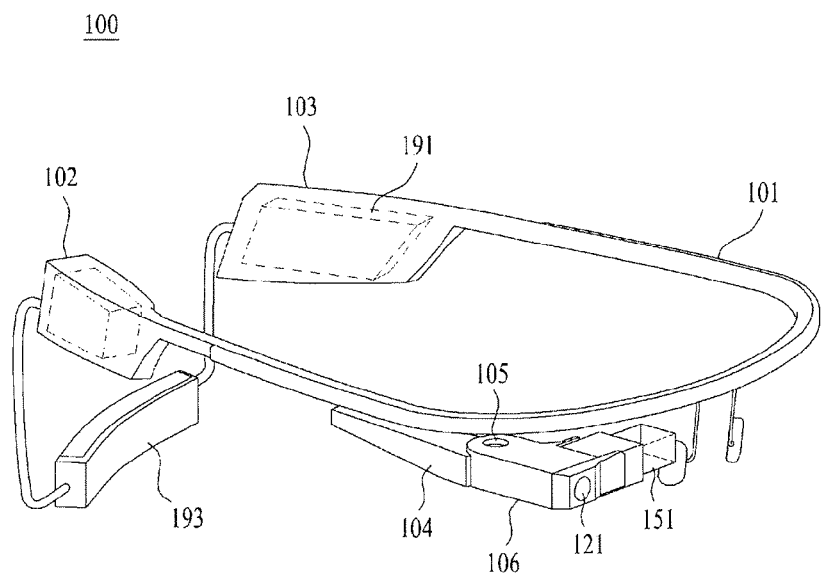
FIG. 8 is a perspective diagram illustrating one embodiment of a method for a user carrying a glass type terminal according to one embodiment of the invention.

FIG. 8 is a diagram illustrating the glass type terminal 100 having an auxiliary battery 193 connected thereto. The portability of the glass type terminal 100 is quite important and the weight of the glass type terminal 100 is limited. Accordingly, the capacity of the battery 191 cannot but be limited such that an auxiliary battery 193 can be connected to the glass type terminal 100 to enlarge the capacity.

As shown in FIG. 8, one end of the auxiliary battery 193 is connected to the input/output port 171 and the other end is connected to the second housing 103 to be located on the back of the user's neck. Accordingly, the uncomfortable wearing which might be caused by the weight of the auxiliary battery 193 can be reduced while the capacity of the battery 191 is enlarged.

When a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A glass type terminal comprising:
   a band frame comprising a front portion located over a user's eyes and a side portion extended toward both ears from the front portion to be worn on the user's head;
   a first housing located in one end of the band frame, in which a first control unit is mounted;
   a second housing located in the other end of the band frame, in which a battery is mounted;
   a third housing coupled to a lateral surface of the band frame, adjacent to the front portion, in which a second control unit is mounted;
   a front housing coupled to the third housing by a hinge frontward; and
   a transparent display coupled to the front housing to be located in front of the user's eyes,
   wherein the band frame comprises a first frame forming an outer portion thereof and a second frame forming an inner portion thereof, and
   wherein one or more of the first and second frames are formed of a metallic material, and the metallic frame is an antenna for transmitting an electromagnetic signal by receiving an electric power.

2. The glass type terminal of claim 1, wherein the first housing or the second housing comprises an input/output port for being provided with data or an electric power.

3. The glass type terminal of claim 2, further comprising:
   an auxiliary battery comprising one end inserted in the input/output port and the other end coupled to the first housing or the second housing where the input/output port is not formed, to apply an electric current through the input/output port.

4. The glass type terminal of claim 1, wherein the first housing further comprises an ear jack.

5. The glass type terminal of claim 1, wherein the hinge of the front housing comprises an angle limiting portion.

6. The glass type terminal of claim 1, wherein the third housing comprises a touch sensor.

7. The glass type terminal of claim 6, wherein the second control unit operates a shutter of a camera of the glasses type terminal when recognizing that the user touches the touch sensor and the touch disappears after that.

8. The glass type terminal of claim 1, wherein the band frame further comprises a cable passage formed between the first frame and the second frame.

9. The glass type terminal of claim 8, wherein a flexible printed circuit board for transmitting a signal between a first control unit and a second control unit and a power cable provided from a battery to the first control unit and the second control unit are mounted in the cable passage.

10. The glass type terminal of claim 1, wherein the metallic frame which is the antenna includes one or more bent portions to transmit a signal in two or more bandwidths.

11. The glass type terminal of claim 1, wherein a weight of the second housing is larger than or the same as a weight of the first housing.

12. The glass type terminal of claim 1, wherein a weight of the first housing is larger than a weight of the third housing and the weight of the front housing.

13. A glass type terminal comprising:
- a band frame comprising a front portion located over a user's eyes and a side portion extended toward both ears from the front portion to be worn on the user's head;
- a first housing located in one end of the band frame, in which a first control unit is mounted;
- a second housing located in the other end of the band frame, in which a battery is mounted;
- a third housing coupled to a lateral surface of the band frame, adjacent to the front portion, in which a second control unit is mounted;
- a front housing coupled to the third housing by a hinge frontward;
- a transparent display coupled to the front housing to be located in front of the user's eyes;
- an input/output port located at the first housing or the second housing for being provided with data or an electric power; and
- an auxiliary battery including one end inserted in the input/output port and the other end coupled to the first housing or the second housing where the input/output port is not formed, to apply an electric current through the input/output port.

* * * * *